May 11, 1937.  E. E. WEMP  2,079,888
CLUTCH COVER PLATE
Filed Aug. 13, 1934   3 Sheets-Sheet 1

INVENTOR.
Ernest E. Wemp
BY
Barnes, Kisselle, Laughlin & Raisch
ATTORNEYS.

May 11, 1937.                    E. E. WEMP                    2,079,888
                              CLUTCH COVER PLATE
                          Filed Aug. 13, 1934          3 Sheets-Sheet 2
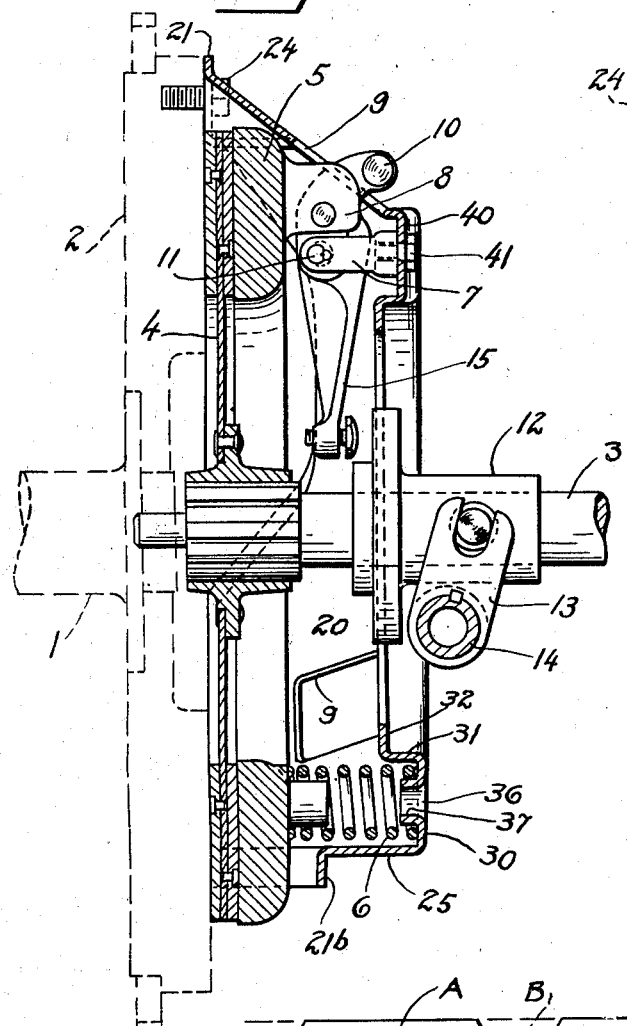
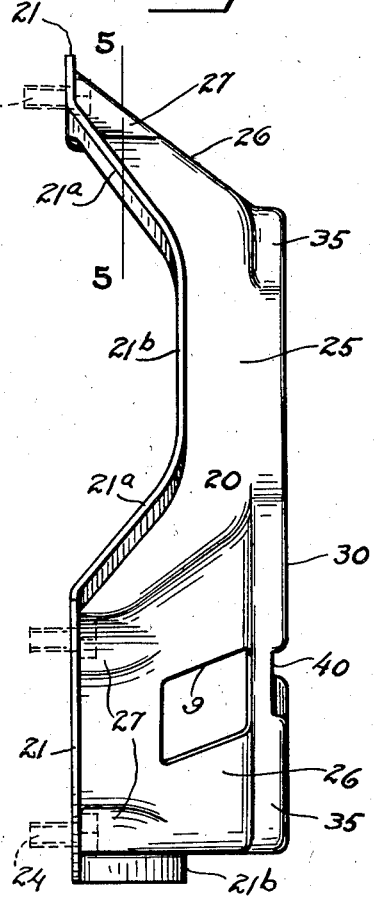
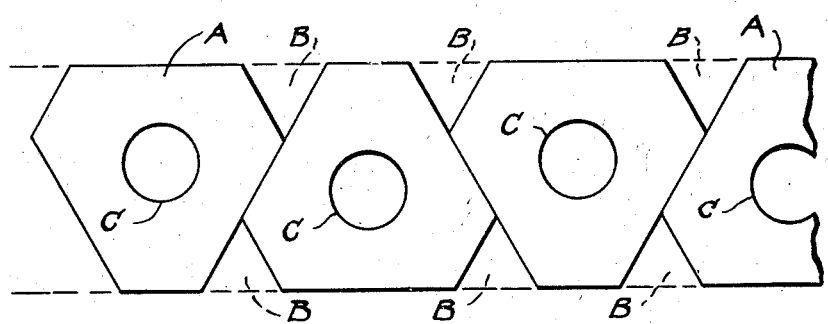
INVENTOR.
Ernest E. Wemp
BY
Barnes, Kisselle, Laughlin & Raisch
ATTORNEYS.

May 11, 1937.　　　　E. E. WEMP　　　　2,079,888
CLUTCH COVER PLATE
Filed Aug. 13, 1934　　　3 Sheets-Sheet 3
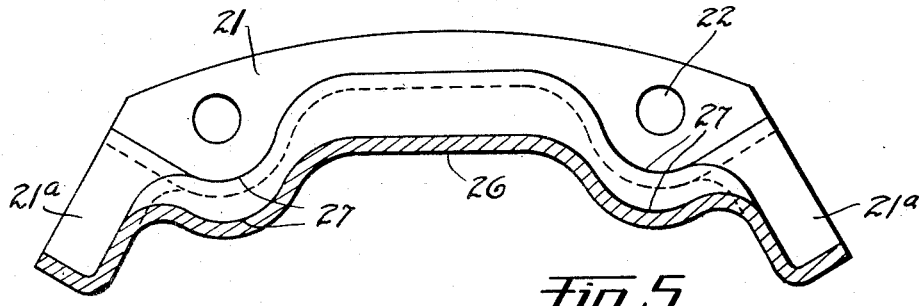
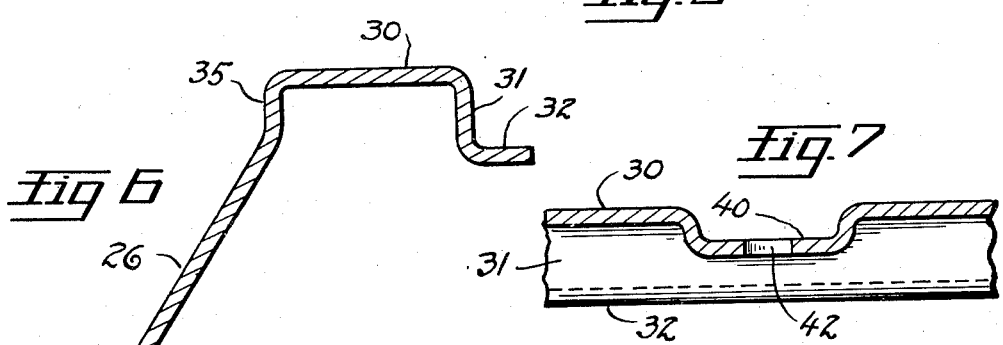
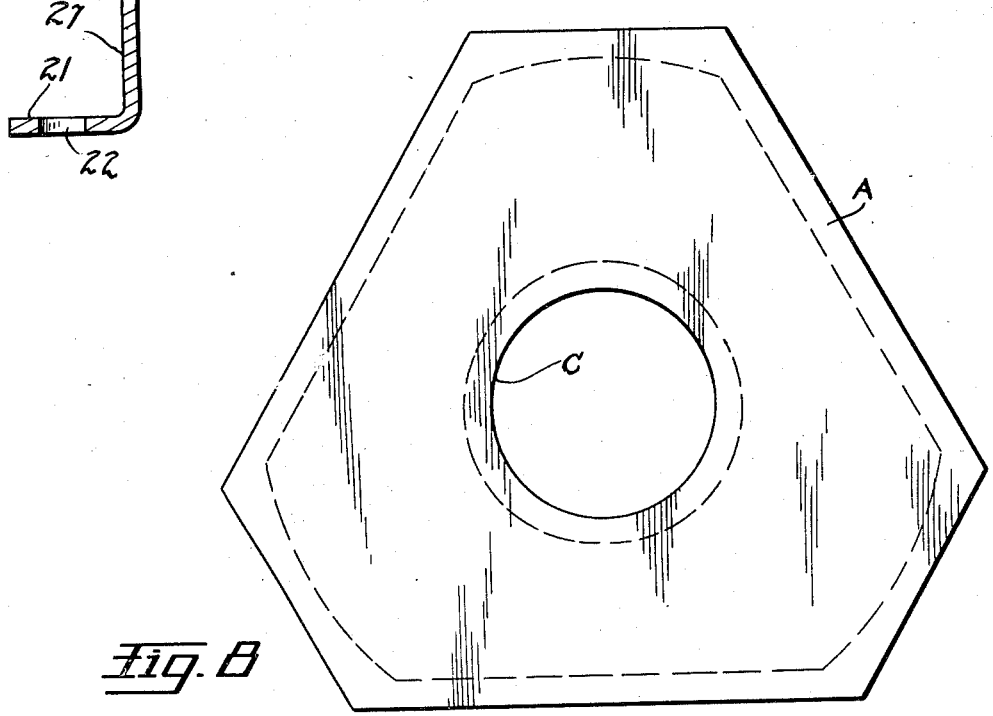
INVENTOR.
Ernest E. Wemp
BY Barnes, Kisselle, Laughlin & Raisch
ATTORNEYS.

Patented May 11, 1937

2,079,888

UNITED STATES PATENT OFFICE 2,079,888

CLUTCH COVER PLATE

Ernest E. Wemp, Detroit, Mich.

Application August 13, 1934, Serial No. 739,517

14 Claims. (Cl. 192—112)

This invention has to do with a clutch cover plate and is directed particularly to the provision of a cover plate for use with clutches ordinarily employed with internal combustion engines. The largest field of use perhaps is in automotive vehicles.

A clutch of the type wherein a cover plate is employed usually has a driving member which is usually the fly wheel of the engine; another driving member may take the form of an axially shiftable pressure plate, and a driven member which may be in the form of a disc is packed between the fly wheel and the pressure plate. The cover plate is secured to the fly wheel and more or less encloses the driven disc and pressure plate and may be used to drive the pressure plate. The cover plate may have a rear wall or the like spaced from the pressure plate and on the side thereof opposite the fly wheel, and one or more packing springs which act upon the pressure plate are arranged to react against this wall portion of the cover plate. The cover plate may also serve for the mounting of clutch releasing levers which, upon proper actuation to release the clutch, compresses the spring or springs.

Heretofore such cover plates have been made up by stamping the same from sheet metal and the cover plate was of circular form, thus conforming in shape to the other clutch parts such as the fly wheel, pressure plate and driven disc. The forming of such a cover plate, in giving the same the requisite depth, results in drawing and thinning of the metal in certain portions thereof. It will be appreciated that slippage of the clutch generates considerable heat, and heretofore apertures have been formed in the clutch cover plates to allow for ventilation.

The present invention involves an improved cover plate structure which accomplishes at once a number of results. A large saving of material results from the making of a clutch cover plate constructed in accordance with the invention; a stronger cover plate is provided, the better to withstand the spring pressure, thus minimizing flexure of the plate and providing a better releasing operation, as will later appear. The structure affords not only a saving in the area of sheet metal stock used, but, due to the structure, stock of a thinner gauge may be employed, while at the same time increased strength is present in the cover plate. The structure of the cover plate admirably affords ventilation for the dissipation of the generated heat, and this without wasting metal stock as by punching holes therein, and without weakening the plate.

These features and objects will be better appreciated by a consideration of the detailed description, in connection with which other objects and features will become apparent.

Fig. 2 is a sectional view taken on line 2—2 of Fig. 1 illustrating the clutch cover plate and also showing associated clutch mechanism.

Fig. 3 is a side view of the clutch cover plate as it would appear looking from the left hand side of Fig. 1.

Fig. 5 is an enlarged sectional view taken on line 5—5 of Fig. 3 showing detailed plate formation.

Fig. 6 is an enlarged sectional view taken on line 6—6 of Fig. 1.

Fig. 7 is a sectional view taken on line 7—7 of Fig. 1.

Fig. 8 illustrates a blank from which the cover plate may be made.

Fig. 9 is a diagrammatical view illustrating how a series of blanks may be cut from sheet metal stock.

Figure 1:
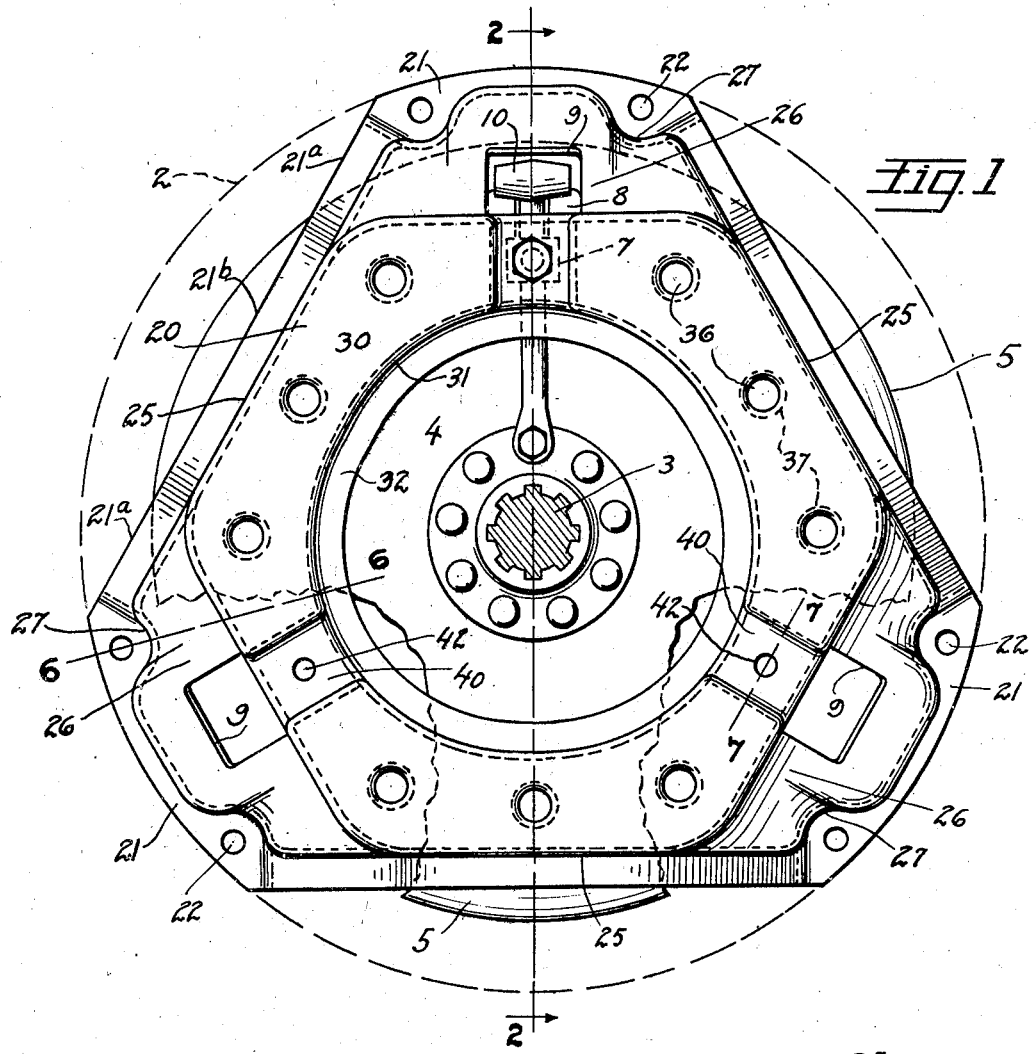
Fig. 1 is an end elevational view of a clutch plate constructed in accordance with the invention, illustrating some of the other clutch parts in association therewith.

The cover plate is shown in Figs. 1 and 2 as being associated with driving and driven clutch parts. The clutch parts shown involve certain unbalanced centrifugal masses, and such a clutch structure is covered in another patent application. This structure is selected merely to illustrate the environment for the cover plate, and it is to be understood that so far as the clutch cover plate is concerned its use is not limited to a clutch structure incorporating such unbalanced centrifugal masses.

The crank shaft of an internal combustion engine is illustrated at 1 with the fly wheel at 2, a driven shaft as shown at 3 mounted upon which is a driven disc 4. A pressure plate 5 is acted upon by a number of coil springs 6 reacting against the rear wall of the cover plate and which pack the clutch members into engagement. In the form shown clutch releasing levers 15 are provided, fulcrumed each on a bracket 7 supported by the cover plate and connected to bosses 8 on the pressure plate. The bosses 8 slidably fit into apertures 9 of the cover plate thus furnishing a driving connection, and in the form shown the levers each have an outer end portion projecting through the apertures and terminating in enlargements 10 which constitute unbalanced centrifugal masses. The fulcrum point 11 is of a special construction to eliminate binding action as the levers rock, and the point of connection with the bosses 8 shifts in a straight line. This connection is, however, unimportant in the present application except to show an operable structure and is covered in the above mentioned application. A clutch throw out bearing is illustrated at 12 shiftable by means of a yoke 13 mounted upon a rock shaft 14 which may be rocked by the usual clutch lever actuation by the foot of the operator in the well known manner. Shift of the throw out bearing 12 to the left causes the same to engage the inner ends of the levers and retract the pressure plate against the spring pressure to release the clutch. The centrifugal masses serve to increase the clutch pressure upon increase of the R. P. M., but this is a matter covered in the other application. This clutch structure is shown in order to illustrate an environment for the clutch cover plate, and as above pointed out the clutch structure is subject to variation without departing from the present invention, and particularly the employment of the unbalanced centrifugal masses may be dispensed with.

The clutch cover plate of the present invention is one which has chordal portions which connect arcs of a circle described by the parts of a clutch cover plate where the same is attached to the fly wheel. To this end the plate may be looked upon as being of polygonal shape as distinguished from the conventional circular shape. The particular structure shown herein depicts a clutch plate of a formation having three chordal portions and secured to the fly wheel at three spaced points, and this plate may be formed of a blank generally of triangular shape. The invention, however, is not limited to a plate having three chordal portions and three places of attachment to the fly wheel, since the structure may be varied without departing from the invention to provide a plate with a fewer number of chordal portions or a greater number of chordal portions, as for example two or four or more than four.

Figure 4:
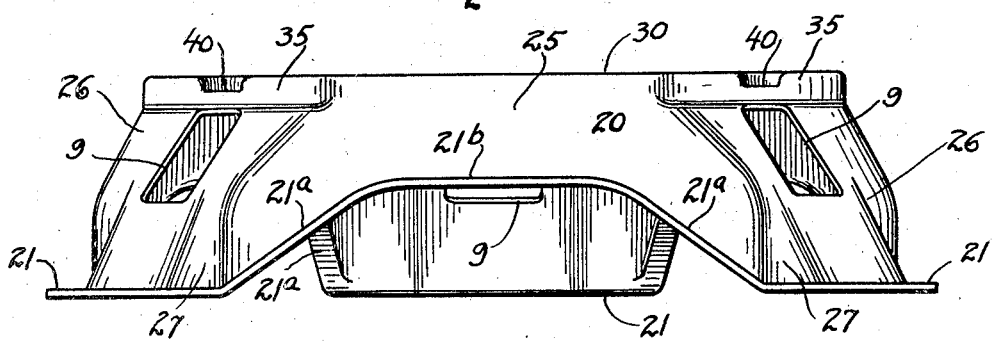
Fig. 4 is a side view of the cover plate with the line of sight substantially normal to a chordal portion of the cover plate.

Now, referring to Fig. 1 it will be noted that the plate assumes a somewhat triangular shape having sides or chordal portions 20 separated by portions for attachment to the fly wheel. A flange 21 may extend around the outer portion of the cover plate and the same may be provided with apertures 22 for attachment to the fly wheel as by means of cap screws or the like, as illustrated at 24 in Fig. 2. The portions of the flange 21 which are provided with the apertures 22 and which lie between the chordal portions are disposed in the common plane as illustrated in Fig. 4 so as to lie flush against the fly wheel. The plate may be fashioned so as to have the requisite depth as illustrated in Figs. 3 and 4. In Fig. 4 it will be noted that the flange 21 defines one edge of the chordal portion and that this edge of the chordal portion has somewhat of an arch or arcuate formation in order to bridge the pressure plate as illustrated in Fig. 1. The shape need not be truly arcuate and in fact, as shown herein, has inclined parts 21a, and a relatively flat portion 21b and is in more of the form of an arch. The chordal portions are constituted by a wall 25 rising from the flange 21 to the rear or what may be termed the bottom portion of the dished cover plate. This wall 25, as will be noted by reference to Fig. 2, is of generous dimensions and provides great strength in the chordal portions. The body of the plate is formed in part by the walls 25 and by riser portions 26 which in the present instance rise from the flange 21 to the rear or bottom portion of the dished plate on an angle. The result of this structure is that the rear or bottom portion of the dished plate partakes of a hexagonal form, as illustrated in Fig. 1, although it is to be appreciated that the invention is not limited to such hexagonal form. The riser portions 26 may be fashioned inwardly as at 27 substantially at the junction of the walls 25 and portions 26 to provide a clearance for the cap screws. The rear portion of the plate is constituted by a wall 30 which preferably lies in a radial plane, the inner edge portion preferably being fashioned to form a radially extending inner wall 31. Preferably the extreme inner edge is again fashioned into a radial plane, this forming a flange 32 defining a central opening. As before mentioned the pressure plate 5 is driven by bosses located in apertures in the pressure plate and these apertures are preferably located adjacent the points of connection with the fly wheel; thus the apertures, as illustrated at 9, are located in the risers 26. The inclined riser portions 26 may terminate short of the rear wall 30 and merge into wall portions 35 which may extend substantially in an axial plane or a plane which may be vertical when the plate is resting in the position shown in Fig. 4.

The rear wall portion 30 may be employed for taking the reaction force of the clutch packing springs, and to this end the same may be apertured at the location of each spring as shown at 36 with the metal surrounding the apertures belled inwardly as at 37 to thus serve as a pilot of a spring. The rear wall 30 may be formed with depressed portions 40 for the reception of the heads of the cap screws 41 which pass through apertures 42 and serve to hold the fulcrum bracket 7 to the cover plate.

A clutch cover plate of this formation may be fashioned from a blank of stock as illustrated in Fig. 8 wherein the sides of the longer dimensions become the chordal portions and the sides of the shorter dimension, i. e., the cut off corners, become frontal portions for attachment to the fly wheel. Blanks of this kind may be stamped out of strip stock after a manner illustrated in Fig. 9. The blanks are shown at A, and every other blank is reversed as regards the strip stock, and the stock may have a width equal to the desired dimension of the blank measured across from one side of large dimension to the opposite side of small dimension. Accordingly it will be noted that the only wastes are triangular portions as illustrated at B, there being two of such portions wasted for each blank, and the center portion which is cut out to form the circular aperture, this being illustrated at C.

In forming the clutch covere plate in this manner, much saving in stock results, and the saving in total area of stock over that of fashioning a circular plate is about 25%. Moreover, due to the increased strength of the plate because of its formation the same may be formed of thinner stock with the result that the total stock saving runs from 35% to 40%. In the fashioning of the plate the operations are largely bending and folding operations with very little drawing and thinning of the metal as distinguished from the drawing and thinning of the metal in the forming of a circular plate. This further facilitates the use of thinner stock as the same is not materially thinned by drawing operations. Inasmuch as the plate is secured to the fly wheel at spaced points, assembly of the clutch is facilitated since the number of cap screws to be inserted is reduced, and likewise the number of tapped apertures required in the fly wheel is reduced. In the form shown the cover plate drives the pressure plate and the driving apertures 9 are located in close proximity to the points of connection to the fly wheel, with the result that the driving action is largely by compression through the metal of the risers 26. This manner of attaching the cover plate at spaced points to the fly wheel is permissible by reason of the great strength afforded by the chordal portions. These chordal portions, as illustrated in Fig. 2, are of channel formation, the channel being constituted by the wall 25, the wall 31 and the wall 30, with the wall 25 having considerable width thus adding great rigidity to these bridging chordal portions. The presence of the outer flange 21 and the inner flange 32 further lends to the rigidity of the chordal portions. It is preferred that the flange 21 on the outside of the plate and the flange 32 on the inside of the plate be employed not only for purposes of strength but for purposes of manufacture. After the plate is completely formed it may be placed in a shaping die and with one stroke thereof flanges 21 and 32 may be trimmed to an accurate shape.

It will be appreciated that the springs 6 exert considerable force upon the pressure plate, and that due to the strength of these springs a large lever advantage is required for the operator in compressing the springs to release the clutch, and when the springs are compressed the pressure on the cover plate is increased. Any flexing of the cover plate under this pressure requires additional movement of the clutch pedal to disengage the clutch properly. Although this flexing may be slight the lever advantage is so great that the additional movement of the lever required by reason of the flexing cuts down a possible lever advantage. With the present rigid clutch plate this flexing is minimized and in this way facilitates an increase in the lever advantage for the operator.

Now, as to ventilation, it will be observed, by reference to Fig. 1, that portions of the pressure plate are exposed underneath the chordal portions. This is also illustrated in Fig. 2. It will also be observed that portions of the driven disc and fly wheel are exposed. This permits free passage of air through the cover plate to aid in the dissipation of heat generated by friction in the clutch. Thus the inherent nature of the plate provides for ventilation without the necessity of wasting metal and decreasing clutch plate strength by forming apertures therein for ventilating purposes.

As before pointed out the invention resides largely in a cover plate having chordal bridging portions, and the plate as a result may be fashioned from a blank of polygonal shape as distinguished from a circular blank. It is preferred that the plate have three chordal portions, thus having three points of contact with the fly wheel especially where three clutch releasing levers are provided. However, it is within the invention to form the plate with a different number of chordal portions.

I claim:

1. For use with a clutch having a driving member, a second driving member, a driven member between the driving members, spring packing means acting upon the second driving member to pack the driving and driven members together, and means for releasing the clutch against the action of the spring means: a clutch cover plate comprising, a sheet metal body member fashioned to provide depth and having frontal portions for attachment to the first driving member and a rear portion against which the spring means reacts, the plate having a substantially polygonal shape such as to uniformly space the frontal portions, with the rear portion axially spaced from the frontal portions and having a wall disposed substantially in the plane of rotation thereof, and sides connecting the spaced frontal portions and each positioned substantially on a chordal line of a circle described by said frontal portions, said sides each comprising a wall extending forwardly from the rear portion, the forward edge portions of said walls having parts extending angularly from said frontal portions toward the rear portion whereby to bridge, on chordal lines, some of the clutch members.

2. A clutch cover plate comprising a sheet metal body member of substantially polygonal shape, the corner portions of the polygon being uniformly spaced with respect to each other and adapted to be attached to a clutch driving member, said plate having depth to provide a rear portion, and side walls extending between the corner portions and positioned substantially on chordal lines of a circle described by said corner portions, said side walls extending forwardly of the rear portion and each comprising a wall substantially normal to the plane of rotation.

3. A clutch cover plate comprising a sheet metal body member of substantially polygonal shape, the corner portions of the polygon being uniformly spaced with respect to each other and adapted to be attached to a clutch driving member, said plate having depth to provide a rear portion, side walls extending between the corner portions and positioned substantially on chordal lines of a circle described by said corner portions, said side walls extending forwardly of the rear portion and each comprising a wall substantially normal to the plane of rotation, and other side portions joining said corner portions with the rear portion and disposed in planes which are at an angle to the plane of rotation and which converge in a direction from the corner portions to the rear portion.

4. A clutch cover plate comprising, a generally triangularly shaped sheet metal body member with the extreme corners removed, said plate being dished with the corners providing frontal portions for attachment to a clutch member, the central portion of the plate constituting a rear portion, substantially straight side portions connecting said corners and each comprising a wall in a plane at a substantial reinforcing angle to the plane of the frontal and rear portions and extending forwardly of the rear portion and with one edge of each wall merging into the rear portion, the opposite edge being substantially of arch formation whereby the same may bridge clutch parts.

5. A clutch cover plate comprising, a generally triangularly shaped sheet metal body member with the extreme corners removed, said plate being dished with the corners providing frontal portions for attachment to a clutch member, the central portion of the plate constituting a rear portion, substantially straight side portions connecting said corners and each comprising a wall in a plane at a substantial reinforcing angle to the plane of the frontal and rear portions and extending forwardly of the rear portion and with one edge of each wall merging into the rear portion, the opposite edge being of arch formation whereby the same may bridge clutch parts, and other wall portions connecting the corners and the rear portion and disposed in planes which are angular with respect to the planes of the frontal and rear portions.

6. A clutch cover plate comprising, a body member of substantially polygonal shape, said body member being fashioned to provide an outer flange, said body member having depth with the center part thereof constituting a rear portion axially spaced from the flange, the flange at the corners of the polygon adapted to be attached to a clutch member, side portions between the flange and the rear portion and connecting the corners and each including a wall in a plane substantially normal to the plane of rotation, said side portions and the flange thereon being of arched form to bridge clutch parts on substantially chordal lines, the rear portion having a central aperture therein, and having a wall around said aperture which extends toward the said flange, whereby said last mentioned wall, the rear portion and the walls define channel formations, and a flange extending inwardly from the last mentioned wall and defining said aperture.

7. A clutch cover plate substantially of polygonal shape having corners for attachment to a clutch member, a rear portion for extending partially over clutch members and which is the rearmost portion of the cover plate, and walls positioned substantially on chordal lines and forwardly of the rear portion connecting the corners and extending to the rear portion, the edges of said walls next adjacent said corner portions receding from the plane of said corners, whereby to bridge and clear clutch parts and to provide for passage of air through the cover plate for ventilation purposes.

8. A clutch cover plate comprising a sheet metal body substantially of polygonal shape, the corners of the polygon providing frontal portions for attachment to a clutch member, the center part of the plate comprising a rear wall substantially in the plane of rotation thereof for receiving clutch packing springs, side walls each having a substantially arched edge joining the frontal portions and merging into the said rear wall and positioned substantially on chordal lines of a circle described by said frontal portions, said center part being fashioned to provide an axially extending wall projecting from the rear wall toward the said frontal portions, whereby said rear wall, side walls and axially extending wall define channel formations.

9. A clutch cover plate comprising a sheet metal body substantially of polygonal shape, the corners of the polygon providing frontal portions for attachment to a clutch member, the center of the plate comprising a rear wall substantially in the plane of rotation thereof for receiving clutch packing springs, substantially straight side walls joining the frontal portions and merging into the said rear wall and positioned substantially on chordal lines of a circle described by said frontal portions, the center of the plate being fashioned to provide an axially extending wall projecting from the rear wall toward the said frontal portions whereby said rear wall, side walls and axially extending wall define channel formations, the free edge of said side walls being of recess formation whereby to bridge and clear clutch parts substantially on chordal lines.

10. For use with a clutch having an axially fixed driving member, a shiftable driving member, a driven member between the driving members, and springs acting upon the shiftable driving member to pack the clutch into engagement; a cover plate comprising a sheet metal stamping of dished form and having a substantially polygonal shape, the corners of the polygon forming uniformly spaced frontal portions for attachment to the fixed driving member, the center portion constituting a rear portion spaced from the frontal portions for housing the springs and against which the springs react, side walls extending substantially on chordal lines from one frontal portion to another and connecting the frontal portions with the rear portion, said side walls each having an edge substantially of arch form whereby to bridge on a chordal line a portion of the shiftable driving member, and other walls inclined in such a manner as to converge toward each other rearwardly and connecting the frontal portions with the rear portion.

11. For use with a clutch having an axially fixed driving member, a shiftable driving member, a driven member between the driving members, and springs acting upon the shiftable driving member to pack the clutch into engagement; a cover plate comprising a substantially triangularly shaped dished stamping, the corners of the triangle each being in the form of a flange and providing a frontal portion for attachment to the axially fixed driving member, the central part of the dished stamping constituting a rear portion for housing the springs and against which the springs react, inclined walls extending from the frontal portions to the rear portion and inclined in such a manner that the walls converge rearwardly, side walls each extending substantially on a chordal line from one frontal portion to another and merging into the rear portion, a flange on the forward edge of each side wall and merging into the flange frontal portions, the forward edge of each side wall and the flange thereon being substantially of arch form whereby to bridge substantially on a chordal line, a portion of the shiftable driving member.

12. A clutch cover plate comprising, a sheet metal stamping substantially of polygonal shape, the corners thereof forming frontal portions for attachment to a clutch driving member, whereby the cover plate is connected to the clutch driving member at spaced localized points, the plate being of dished form and the center thereof forming a rear portion substantially in the plane of rotation thereof and against which clutch packing springs may react, the plate having side walls extending forwardly from the rear portion and connecting the corners on chordal lines of a circle described by the corners, and other walls extending from the rear portion to each corner, said other side walls being angularly disposed and diverging from the rear portion toward said corners, said angularly disposed walls each having an opening therein for the reception of driving lugs of another clutch member and which are located in close proximity to the spaced localized points of connection between the cover plate and the clutch driving member, whereby driving action from the one clutch member to the other is transmitted through metal of the cover plate localized in close proximity to the spaced localized points of connection of the cover plate to said clutch driving member so that distortion of the cover plate in transmitting such drive is substantially eliminated.

13. A clutch cover plate comprising, a sheet metal body member of substantially polygonal shape, the corner portions of the polygon being substantially uniformly spaced with respect to each other and adapted to be attached to a clutch driving member, said plate having depth to provide a rear portion, and the depth being such that the cover plate is adapted to cover clutch packing springs and partially cover clutch releasing levers, and substantially straight side walls extending between the corner portions and positioned substantially on chordal lines of a circle described by said corner portions, said side walls connecting with and extending forwardly of the said rear portion for partially closing the sides of the cover plate.

14. A clutch cover plate comprising, a sheet metal body member of substantially polygonal shape, the corner portions of the polygon being substantially uniformly spaced with respect to each other and forming frontal portions for attachment to a clutch driving member, said body member being of dished formation with its center part constituting a rear portion axially spaced from the frontal portions, whereby the cover plate is adapted to cover clutch packing springs, and substantially straight side walls projecting forwardly from the rear portion and at a reenforcing angle therewith and partially closing the sides of the cover plate, said side walls extending between the corner portions and positioned substantially on chordal lines of a circle described by said corner portions.

ERNEST E. WEMP.